Jan. 25, 1949.    C. H. VINCENT    2,460,046
INTERNAL-COMBUSTION ENGINE
Filed Oct. 31, 1944

INVENTOR.
CHARLES H. VINCENT
BY
Tibbetts & Hart
Attorneys

Patented Jan. 25, 1949

2,460,046

UNITED STATES PATENT OFFICE 2,460,046

INTERNAL-COMBUSTION ENGINE

Charles H. Vincent, Avoca, Mich., assignor to Packard Motor Car Company, Detroit, Mich., a corporation of Michigan Application October 31, 1944, Serial No. 561,181

4 Claims. (Cl. 123—127)

This invention relates to internal combustion engines and more particularly to means controlling the flow of combustible fuel mixture in such engines.

The invention is designed for use in automobile engines but may be of value in engines of other types.

An automobile engine to be commercially acceptable must have power for all sorts of driving such as on steep hills at low speed and on level straight roads at high speed. It must idle well in coasting when the car is turning the engine over rapidly in downhill driving. It must idle smoothly at the curb. And it must above all not be too lavish in the use of fuel, particularly at the cruising speeds.

High gas velocity in the intake manifold induces good atomization and this permits the use of leaner mixture, and consequently better economy. But high gas velocity cannot be attained in a relatively large manifold and yet a large manifold is required if high power is to be attained at high speed. A smaller manifold will supply an engine at low speed but there must be no throttling of the mixture by a small manifold if full power is to be attained at high speed.

Usually therefore the manifold and carburetor sizes of an engine are a compromise which produces neither the best fuel economy nor the greatest power at high speed. Usually both suffer somewhat.

In the present invention, means are provided for so controlling the flow of combustible fuel mixture to the engine that high gas velocities are attained at all low engine speeds and yet at high engine speeds there is ample manifold capacity and good carburetion to obtain the full power of the engine and consequently the desired high speed of the car with comparatively low gas velocities.

It is therefore one of the objects of the invention to provide apparatus for supplying a combustible mixture for an internal combustion engine and so control such mixture that the highest power of the engine may be obtained and that the fuel economy may be improved, particularly through the cruising and low speed ranges.

Another object of the invention is to provide a fuel feeding means and controlling means therefore such that high gas velocities will be attained at the low engine speeds and a maximum quantity of mixture for high power will be supplied at the higher engine speeds.

Other objects of the invention will appear from the following description taken in connection with the drawings, which form a part of this specification, and in which.

Figure 1:
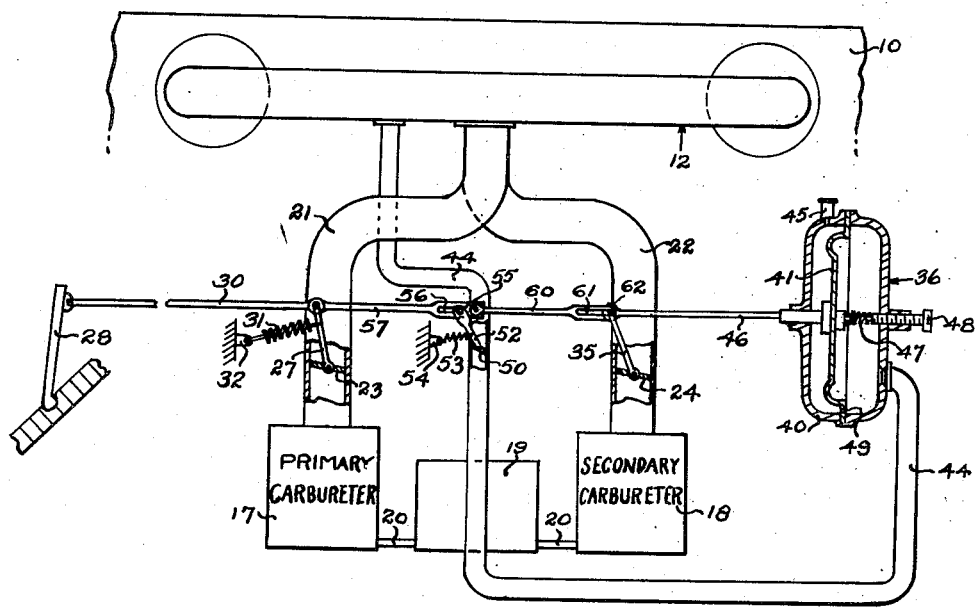
Fig. 1 is a side elevational view of a portion of an internal combustion engine and a fuel mixture supply and control apparatus, parts being schematically illustrated.
Figure 2:
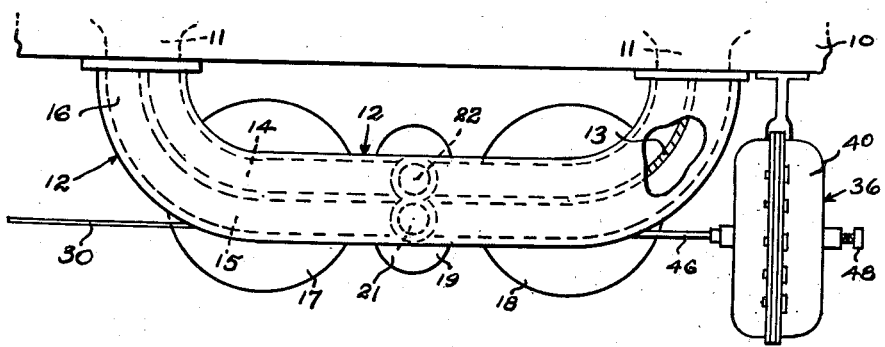
Fig. 2 is a plan view of the engine and apparatus shown in Fig. 1.

Referring to the drawings, reference character 10 indicates the cylinder portion of an internal combustion engine having one side formed with inlet passages 11 through which fuel mixture flows to the interior of the cylinders in a conventional manner.

The invention contemplates the provision of fuel supply apparatus for association with these passages 11 that will improve both engine power and economy. The apparatus as shown herein includes a manifold 12 having an interior partition or wall 13 dividing the manifold into two separate parallel galleries 14 and 15 extending throughout the length thereof. The ends 16 of the manifold are secured by suitable means to the cylinder portion of the engine so that the galleries are in open communication with the inlet passages 11 thereby delivering the fuel mixture to the passages adjacent the inlet valves of the engine.

Two carburetors 17 and 18 are shown and these are designated as "primary carburetor" and "secondary carburetor," respectively. These carburetors may receive liquid fuel from a common supply bowl or fluid chamber 19 as through suitable connections 20.

The carburetor 17 is shown connected to the gallery 15 of the manifold 12 by an inlet pipe or conduit 21 and the carburetor 18 is connected to the gallery 14 by an inlet pipe or conduit 22, and there is a throttle valve 23 in the conduit 21 and a throttle valve 24 in the conduit 22. Thus the mixture from the carburetors is separately fed through the conduits 21 and 22 to the divided manifold 12 through its galleries 15 and 14 to the inlet passages of the engine.

There are separate means for controlling or opening and closing the throttle valves 23 and 24. One of these means is a manually operated device, which device controls the operation of the carburetor throttle 23. The other of these means is a device preferably power operated by the engine. This device is connected to open and close the throttle valve 24. There is also a means for forestalling the operation of the power operated device so that it will come into operation only under certain conditions, as will appear from the following description.

The manually operated device is shown in the form of the conventional accelerator pedal 28 which is connected by link 30 to an arm 27 on the throttle valve 23. A spring 31 retains the valve 23 in closed position as shown in Fig. 1 of the drawing. As the accelerator pedal is pressed to the right, the valve is opened and when released the spring 31 will close the valve.

The power operated device 36 is shown in the form of a casing 40 containing a flexible diaphragm 41 which when connected by a pipe 44 to a suitable part of the manifold 12 will act as a servo motor to move a link 46 connected to a pin end 62 of an arm 35 on the throttle valve 24. A spring 47, adjustable as by a threaded stop 48, tends to move the rod 46 toward the left in Fig. 1 and consequently to close the throttle 24. Suction or pressure drop in the pipe 44, acts upon the diaphragm 41 to move it toward the right in Fig. 1 and consequently to open the throttle valve 24.

But the pipe 44 is not constantly connected to the inlet manifold 12. Operation of the servo motor may be forestalled by cutting off its connection with the manifold, and as shown this is done by a valve 50 mounted in the pipe 44. An arm 52 is connected to the valve 50 for operating it and a link 57 connects the arm 52 with either the arm 27 of the throttle valve 23 or to the rod 30 of the accelerator pedal 28, this connection being through a lost motion device in the form of a pin 55 and a slot 56, the latter formed in the end of the rod 57. There is also a spring 53 connected to the arm 52 and to a bracket 54 on the engine which tends to yieldingly retain the valve 50 in its closed position.

There is an inter-connection between the manually operated device and the valve 24 of the carburetor 18 which insures the closing of the valve 24 when the valve 23 of carburetor 17 is in closed position. This inter-connection is in the form of a rod 60 shown as connected to the rod 57 and as having a slotted end 61 through which the pin end 62 of arm 35 passes. Thus there is a lost motion connection by which the valve 24 closes as the valve 23 is closed, but when the valve 23 is moved towards open position the valve 24 may remain closed until it is opened by the servo device 40.

From the above, it will be seen that the valve 50 will remain in its closed position during a portion of the opening movement of the valve 23 of the primary carburetor and while so closed the engine-operated device, or servo motor 40, will retain the valve 24 of the secondary carburetor in closed position by reason of the spring 47 moving the diaphragm 41 toward the left in Fig. 1. But when the throttle valve 23 reaches a predetermined degree of opening, for example, about three-quarters open, the rod 57, as the accelerator pedal 28 is further depressed, operates through the arm 52 to open the valve 50, thus subjecting the right-hand side of the casing 40 of the servo device to the partial vacuum or reduced pressure of the intake manifold 12 thus conditioning the power device for operation to open the valve 24 of the secondary carburetor. If the car is moving slowly uphill, the pressure in the inlet manifold would probably not be sufficiently reduced to move the diaphragm 41 and consequently the throttle valve 24 will not be opened, and it will not be necessary or desirable to have that valve open under those conditions because the primary carburetor will sufficiently supply the engine under those conditions. But if the car is moving more rapidly and its full power is desired at the high speed, the depression in the inlet manifold 12 will then be sufficient to move the diaphragm 41 and the throttle valve 24 will then be opened thus supplying additional mixture to the engine and permitting it to operate at its greatest power at the high speed. At all primary carburetor openings below the point at which the valve 50 is open, the primary carburetor will be operating alone and the small conduit 21 into small gallery 15 will feed the engine and by reason of the small capacity of these passages there will be a high velocity in them and the carburetor will operate with an economical lean mixture. Also, the conditions will be such that the engine will idle smoothly.

Whenever the throttle 23 is closed as by relieving pressure on the accelerator 28, the throttle valve 24 will also be positively closed by reason of the link 60, thus avoiding any possible sticking of the valve 24 in its open position. The return of the diaphragm 41 is aided by vent 45 in the casing and vent 49 in the diaphragm.

In the preferred form of the invention, the primary carburetor will be arranged to deliver a somewhat larger volume of fuel mixture than the secondary carburetor since the primary carburetor operates throughout a rather wider range of the speeds of the engine. However, good results may be obtained by making the carburetors and conduits of the same size. The primary carburetor is preferably adjusted to meet the best low power range and idling requirements and the secondary carburetor will provide the greater power requirements at the high speed conditions.

It will be understood that various forms of the invention other than that described above may be used without departing from the spirit or scope of the invention.

What I claim is:

1. In an internal combustion engine having fuel inlet passages, a manifold having a pair of parallel galleries each of which is connected with all of the engine inlet passages, a primary carburetor connected with one gallery, a secondary carburetor connected with the other gallery, throttle control valves for the carburetors, actuator means for the throttle valve of the primary carburetor, pressure responsive means for actuating the throttle valve of the secondary carburetor, a connection from one of the manifold galleries to the pressure responsive device, a valve in the connection, and means operated by the actuator means for the throttle valve of the primary carburetor for controlling the valve in said connection, said valve controlling means being operated to open the valve in the pressure connection only after the throttle valve of the primary carburetor is partly open.

2. In an internal combustion engine having fuel inlet passages, the combination of a primary carburetor and throttle valve, a secondary carburetor and throttle valve, parallel manifolds adapting said carburetors to feed fuel mixture separately to said passages, a manually operated device for opening and closing the throttle valve of the primary carburetor, a device operable to open and close the throttle valve of the secondary carburetor, means forestalling the operation of the latter device, means dependent for its operation upon the position of the throttle valve of the primary carburetor for rendering ineffectual said forestalling means, and means positively closing the throttle valve of the secondary carburetor when the throttle valve of the first said carburetor is moved to closing position.

3. In an engine having mixture inlet passages, in combination, two throttle valves in respective inlet passages in parallel relation, a manually operated device for opening and closing one of said valves, a device operated by pressure in said inlet passages on the engine side of said valves for opening and closing the other of said valves, means forestalling the operation of the latter device, and means dependent upon the position of the first said valve for releasing the forestalling means.

4. In an engine having mixture inlet passages, in combination, two throttle valves in respective inlet passages in parallel relation, a manually operated device for opening and closing one of said valves, a device operated by pressure in said inlet passages on the engine side of said valves for opening and closing the other of said valves, means forestalling the operation of the latter device, means dependent upon the position of the first said valve for releasing the forestalling means, and means positively closing the second said valve as the first said valve is moved to closed position.

CHARLES H. VINCENT.

REFERENCES CITED

The following references are of record in the file of this patent:

UNITED STATES PATENTS

| Number | Name | Date |
|---|---|---|
| 1,623,750 | Pingree | Apr. 5, 1927 |
| 2,282,311 | Ericson et al. | May 12, 1942 |
| 2,313,258 | Olson | Mar. 9, 1943 |
| 2,317,625 | Mallory | Apr. 27, 1943 |
| 2,355,716 | Ericson et al. | Aug. 15, 1944 |
| 2,376,732 | Strebinger | May 22, 1945 |